United States Patent [19]

Krank et al.

[11] Patent Number: 6,002,755
[45] Date of Patent: Dec. 14, 1999

[54] METHOD FOR PROVIDING CALL-CHARGE INFORMATION AS WELL AS CALL-CHARGE DEVICE, SUBSCRIBER TERMINAL AND SERVICE UNIT

[75] Inventors: Lothar Krank, Leonberg; Wolfgang Lautenschlager, Weissach-Flacht; Uwe Stahl, Leonberg; Hartmut Weik, Stuttgart, all of Germany

[73] Assignee: Alcatel Alsthom Compagnie Generale d' Electricite, Paris, France

[21] Appl. No.: 09/021,111

[22] Filed: Feb. 10, 1998

[30] Foreign Application Priority Data

Feb. 21, 1997 [DE] Germany ............................ 197 06 579

[51] Int. Cl.⁶ ................................................. H04M 15/00
[52] U.S. Cl. ........................... 379/130; 379/112; 379/114; 379/144; 379/88.16
[58] Field of Search ................................. 379/88.16, 112, 379/114, 115, 121, 130, 144

[56] References Cited

U.S. PATENT DOCUMENTS

| | | | |
|---|---|---|---|
| 4,726,056 | 2/1988 | An et al. ................................. | 379/115 |
| 5,440,621 | 8/1995 | Castro ..................................... | 379/144 |
| 5,859,902 | 1/1999 | Freedman ............................... | 379/114 |

*Primary Examiner*—Paul Loomis
*Attorney, Agent, or Firm*—Ware, Fressola, Van Der Sluys & Adolphson LLP

[57] ABSTRACT

The invention relates to a method for providing a subscriber (SUB1) with information relating to call-charges for telecommunication services associated with a communication link, as well as a call-charge device (CHARGE), a subscriber terminal (TE4) and a service unit for carrying out the method. The call-charge device (CHARGE) receives one or several of the call-metering messages (MP) associated with the communication link and calculates while the communication link is operative, from these messages (MP) the charges (CH) accrued for the communication link. The call-charge device (CHARGE) then associates with the calculated charges (CH) an acoustic signal and generates an electric signal (ES) which corresponds to the associated acoustic signal. The acoustic signal is subsequently conveyed to the subscriber (SUB1) with the help of an electro-acoustic transducer (LS) which is controlled by the electric signal (ES).

8 Claims, 3 Drawing Sheets

METHOD FOR PROVIDING CALL-CHARGE INFORMATION AS WELL AS CALL-CHARGE DEVICE, SUBSCRIBER TERMINAL AND SERVICE UNIT

BACKGROUND OF THE INVENTION

1. Technical Field

The invention relates to a method for providing a subscriber with information relating to call-charges for telecommunication services associated with a communication link, a call-charge device, a subscriber terminal for connection to a communication network, and a service unit of a communication network.

2. Discussion of Related Art

The conventional method of charging for telecommunication services in telephone networks is described, for example, in chapter "3.4.1 Secondary Exchange" in the book "Fundamentals of telephone switching engineering", by Gerd Siegmund, published by R. v. Decker Verlag, G. Schenk, 1991, pages 93 to 94.

During the call set-up phase, the tariff zone of the communication link to be set up is determined and a metering pulse generator is configured accordingly. As long as the communication link is operative, metering pulses are transmitted by the metering pulse generator via the two-wire line of the voice channel. The pulse repetition rate of the metering pulse generator corresponds to the tariff zone determined when the connection was set up, wherein each metering pulse is representative of one charge unit charged for using the telecommunication service, in this case the voice connection.

The metering pulses can also be provided to the calling subscriber terminal via the two-wire line in the voice circuit. By evaluating the number of the received metering pulses, the terminal can then calculate the charges which were actually incurred for the communication link, and display these charges to the subscriber by way of a call-charge display.

This solution, however, has the disadvantage that the display displaying the calculated charges cannot be monitored continuously during the call. For example, in many terminals the display is integrated with the handset. Consequently, the incurred charges can only be determined at the end of a call. It is thus not possible to monitor and influence these charges.

SUMMARY OF INVENTION

It is therefore an object of the invention to improve the transmittal of information about the actual charges for using telecommunication services.

According to a first aspect of the invention, a method for providing a subscriber with information relating to charges for telecommunication services associated with a communication link, wherein with the method a call-charge device receives one or more call-metering messages associated with the communication link and calculates from the received call-metering messages the charges accrued during operation of the communication link, is characterized in that the call-charge device associates with the calculated charges an acoustic signal which causes an electric signal corresponding to the associated acoustic signal to be generated, and that the acoustic signal is conveyed to the subscriber by an electro-acoustic transducer controlled by the electric signal.

According to a second aspect of the invention, a call-charge device for informing a subscriber about charges for telecommunication services associated with a communication link, comprising a calculating unit for receiving call-metering messages and for calculating charges accumulated during operation of the communication link from one or more received call-metering messages, is characterized in that the call-charge device is provided with a signal generator for associating an acoustic signal with calculated charges and for generating an electric signal corresponding to the acoustic signal.

According to a third aspect of the invention, a subscriber terminal for connection to a communication network comprises a call-charge device and an electro-acoustic transducer adapted to be controlled by the electric signal and capable of transmitting the acoustic signal to the subscriber.

According to a fourth aspect of the invention, a service unit of a communication network comprises a call-charge device and a coupler adapted to couple the electric signal during the operation of the communication link into a voice channel associated with the communication link.

According to the primary concept of the invention, the calculated charges are no longer visually displayed to the subscriber by, for example, a display; instead, an acoustic signal is associated with the calculated charges and transmitted to the subscriber.

In this way, the subscriber can advantageously be informed about the actual charges even during the call.

These and other objects, features and advantages of the present invention will become more apparent in light of the detailed description of a best mode embodiment thereof, as illustrated in the accompanying drawing.

BRIEF DESCRIPTION OF THE DRAWING

In the following, the invention will be described in more detail with reference to two embodiments in conjunction with the appended drawings. In the drawings is shown in.

DETAILED DESCRIPTION OF PREFERRED EMBODIMENTS

In the following first embodiment, there is described how the method of the invention can be implemented with a call-charge device of the invention located in a subscriber terminal of the invention.

Figure 1:
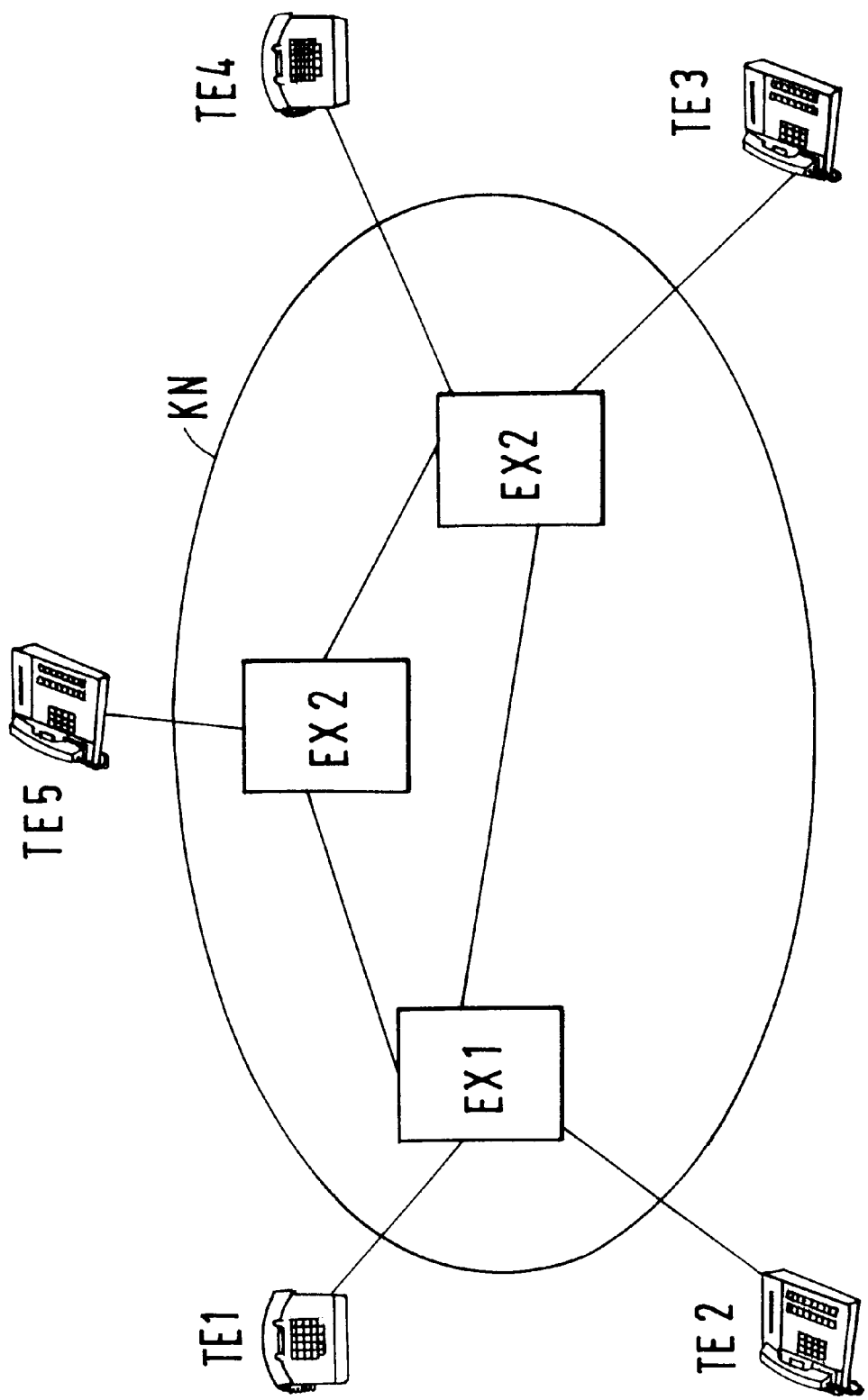
FIG. 1 is a block diagram of a communication system.

In FIG. 1, there is depicted a communication system with a communication network KN and five terminals TE1 to TE5 connected to the communication network KN. The communication network KN includes several exchanges which are meshed and connected with each other; with three of these exchanges EX1 to EX3 shown in FIG. 1.

The communication network KN is a conventional public telephone network and the exchanges EX1 to EX3 are conventional exchanges for a telephone network of this type. For example, the digital exchange system A 1000 S12 from Alcatel can represent such an exchange.

The communication network KN can also be formed from several public and/or private communication networks. Such different, mutually connected communication networks can, for example, be the networks of different network operators in local subscriber loops as well as in long-distance networks. Private networks can also be company-internal networks which use additional leased or dial-up lines from other communication networks.

The invention can advantageously be employed not only with telephone networks, but with communication networks in general, such as networks adapted to transmit data, video signals or mixed forms of information signals, for example a combination of voice, video and data.

The terminals TE1 to TE5 are conventional terminals for connection to a telephone network, for example telephone sets, mobile radio terminals, fax machines or computers equipped with a suitable modem or ISDN card (ISDN= Integrated Services Digital Network).

Figure 2:
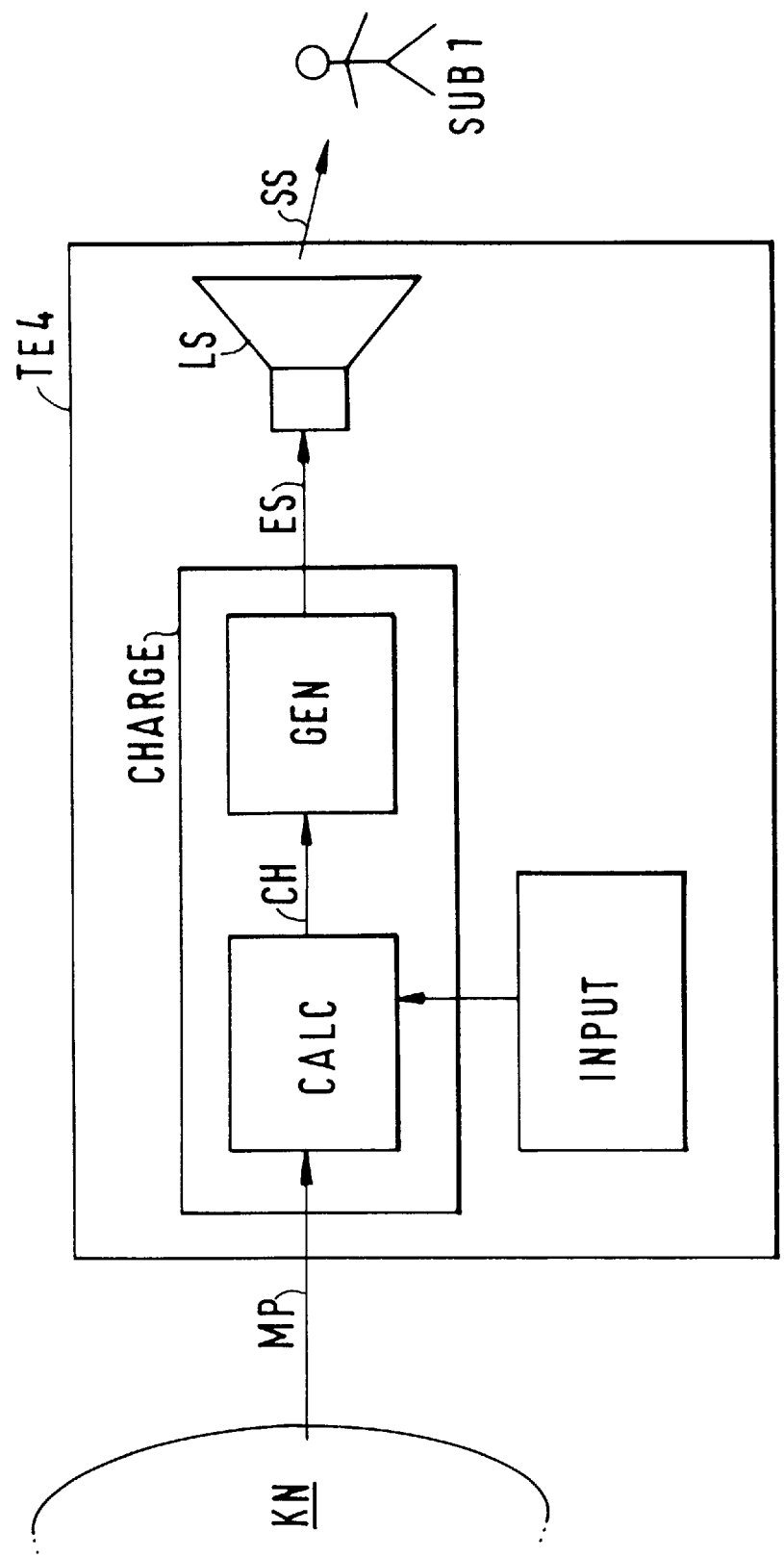
FIG. 2 is a block diagram of a subscriber terminal according to the invention for the communication system of FIG. 1.

FIG. 2 shows the terminal TE4 which represents a terminal equipped according to the invention, in greater detail.

The terminal TE4 comprises a call-charge device CHARGE, an electro-acoustic transducer LS and an input device INPUT. The terminal TE4 is operated by a subscriber SUB1. The call-charge device CHARGE includes a calculating unit CALC and a signal generator GEN.

The calculating unit CALC receives call-metering messages MP which are transmitted to the terminal TE4 via the subscriber line from the subscriber exchange EX2 associated with the terminal TE4. The call-metering messages MP represent the metering pulses transmitted from the subscriber exchange EX2 via the voice channel, if the terminal TE4 is the terminal of an analog subscriber line.

In the case of an ISDN line, the call-metering messages MP are the call-metering messages transmitted via the ISDN D-channel (Advice of Charge Messages).

It is also possible to send this type of call-metering messages MP to the terminal TE4 only once, for example when the connection is set up, and to transmit data relating to the tariff for the selected telecommunication service, such as the charges per time unit or a fixed charge for using the selected telecommunication service, with the call-metering message MP. Call-metering messages MP containing such charge information can also be transmitted from the subscriber exchange EX2 to the terminal TE4 several times during the operation of the communication link, for example, if the tariff changes during the duration of the connection or if a fixed charge is assessed for using the telecommunication service.

The term "telecommunication services" for which call-metering messages MP are transmitted from the exchange EX2 to the terminal TE4 during their use, relates to communication services, i.e. charges for the communication link, as well as to other services, such as an information service provided via IN.

The received call-metering messages MP are entered into the calculating unit CALC and processed, and the actual charge for the total of the telecommunication services used during the connection is calculated by the calculating unit CALC while a communication link is operative.

If the call-metering messages MP are in the form of metering pulses, then these metering pulses are added, starting from the time the connection is established, and the calculated total of the metering pulses is a measure for the actually accrued charges.

If the charge information relates to information about a tariff, then the actually accrued charges are obtained by multiplying this tariff with the elapsed time since connection was set up.

If the charge information relates to information about a fixed amount, then the charge associated with this fixed amount is determined and added to the total charges already accrued during the connection.

If a special event occurs, then the calculated actual charges are transmitted to the signal generator GEN as charges CH. The accrued charges can then be calculated continuously during the connection, or can be triggered by the special events.

This special event or these special events can take place in different ways and at different times as follows:

The special events are generated by the calculating unit CALC periodically during the connection. The events are generated, for example, every 30 seconds, i.e. the actually calculated charges are transmitted every 30 seconds to the signal generator GEN.

The special events are generated by the calculating unit CALC periodically, depending on the calculated, actually accrued charges. An event is generated each time when a certain charge amount has accrued since the last event. For example, an event is generated if charges in the amount of 1, 2, 3, . . . DM have accrued.

A special event is generated if the actually accrued charges reach a certain predetermined charge threshold. In this case, the signal generator may only receive the message that this charge threshold has been reached.

The variable parameters used for generating the special event, such as time period, charge period or charge threshold, as well as the way the charges are generated, can be set via the input device INPUT. However, the input device INPUT can also be omitted, or only one of the aforedescribed methods for calculating the charges may be provided.

The signal generator GEN associates an acoustic signal with the calculated charges CH and generates an electric signal ES which corresponds to the acoustic signal.

With the calculated charges CH there is, for example, associated a voice rendition of the charge amount CH or of an equivalent to the charge amount (number of charge units). The voice rendition of the charge amount is here composed of speech fragments previously stored in the signal generator GEN, wherein the speech fragments are associated with the respective transmitted charges CH via an allocation algorithm.

This association is particularly simple and only a small amount of memory is required for storing the fragments, if the events are generated periodically with the charges.

It is also feasible to associate with the speech signal the voice rendition of predetermined fixed messages, such as "charge threshold reached". Moreover, a predetermined audio signal or a sequence of audio signals can also be associated with the calculated charge CH.

It is also feasible that the subscriber SUB1 can set the type of the associated speech signals via the input device INPUT. The input device INPUT is, for example, in the form of a keypad or keyboard of the terminal TE4. However, the input device INPUT can also be provided with a voice recognition device for accepting voice input.

If the terminal TE4 is a telephone set, then the electro-acoustic transducer LS is preferably the loudspeaker of the voice circuit disposed inside the handset. The electric signal ES is here coupled into the voice circuit before the loudspeaker.

The information about the telecommunication services utilized by the subscriber for a connection are thus provided to the subscriber in the following manner:

The subscriber SUB1 uses the terminal TE4 to set up a communication link in the communication network KN and utilizes telecommunication services in the communication network KN. When the communication link is set up or during the time the communication link is operative, the communication network KN transmits to the terminal TE4 one or more call-metering messages MP. The calculating device CALC calculates from these call-metering messages MP the actual accrued charges CH, wherein the signal generator GEN associates with these call-metering messages MP an acoustic signal and generates an electric signal which corresponds to the associated acoustic signal. This electric signal is coupled in before the electro-acoustic transducer LS and transformed by the electro-acoustic transducer LS into a sound signal SS which corresponds, of course, also to the associated acoustic signal. This sound signal is then received by the subscriber SUB1.

In the second embodiment, there is described how the method of the invention is carried out with the call-charge device of the invention which is disposed in a service unit of the invention.

Figure 3:
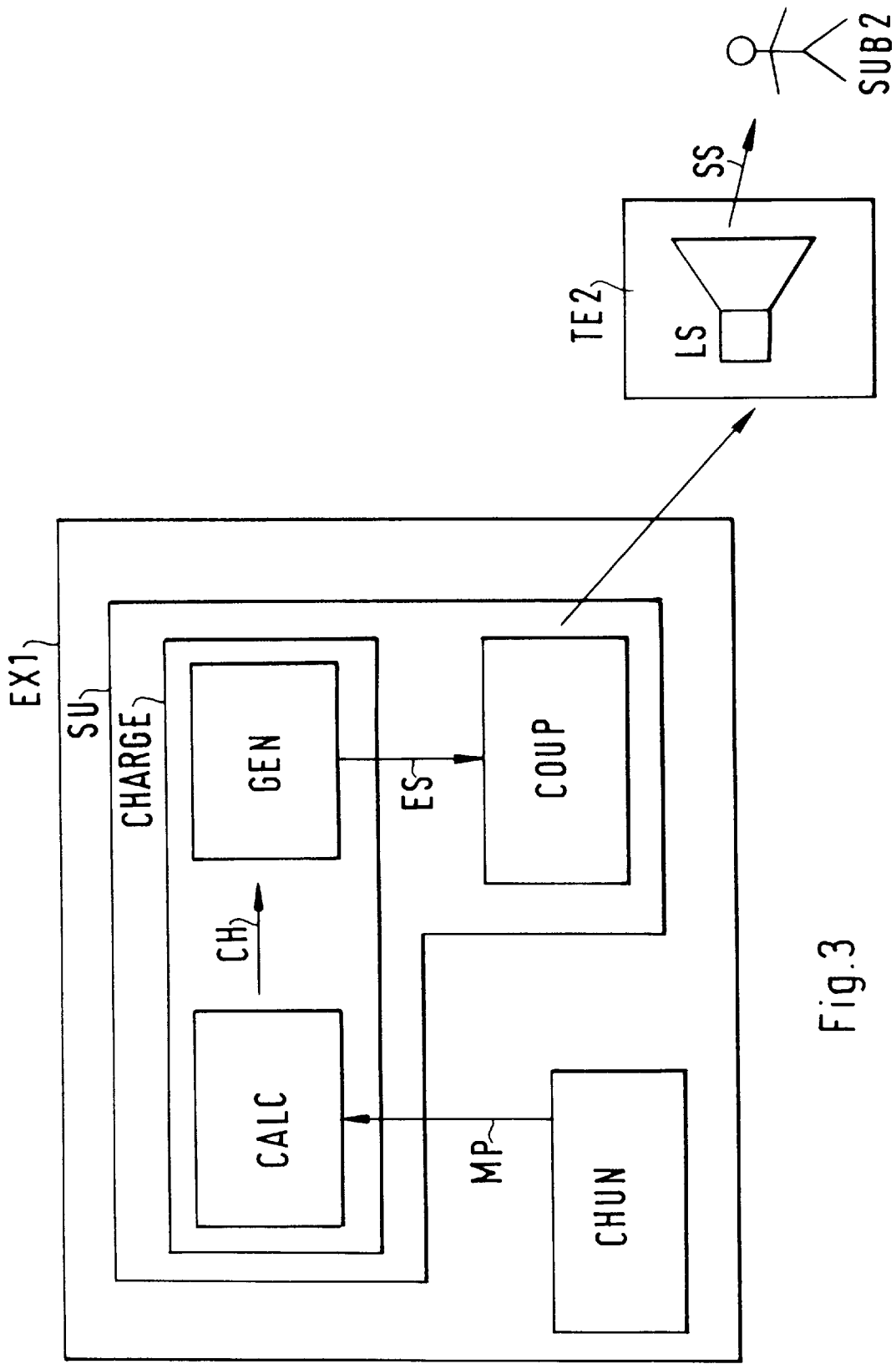
FIG. 3 is a block diagram of a service unit according to the invention for the communication system of FIG. 1.

FIG. 3 shows a detailed diagram of the exchange EX1 and the terminal TE2.

The exchange EX1 comprises, aside from the functional groups generally found in an exchange, a charge determination device CHUN and a service unit SU with a call-charge device CHARGE and a coupler COUP. The terminal TE2 which is operated by a subscriber SUB2, includes the electro-acoustic transducer LS. The call-charge device CHARGE includes the calculating device CALC and the signal generator GEN.

The charge determination device CHUN determines the tariff to be applied to a connection and generates the call-metering messages MP by evaluating, for example, the telephone number of the called subscriber when the connection is set up.

The call-charge device CHARGE is constructed as illustrated in FIG. 2.

The coupler COUP couples the signal ES into the same voice channel which is set up by terminal TE2 via the exchange EX1 between the called terminal and the terminal TE2 in the direction of terminal TE2 as long as a communication link is operative. The coupled-in signal ES is then transmitted together with the voice traffic via this voice channel to the electro-acoustic transducer LS in the terminal TE2 and from there in the form of an acoustic signal SS to the subscriber SUB2.

The service unit SU and the coupler COUP need not be integrated with the subscriber exchange EX1 of the terminal TE2, but can instead be integrated with another exchange of the communication network KN or with a remote service computer, for example a service control point (SCP) within an IN (IN=Intelligent Network) architecture. In the case where the service of a service unit is provided with an IN architecture, the coupler COUP and the signal generator GEN can be placed apart from the calculating device CALC, for example in a service support system (IP=Intelligent Peripheral). The service support system is functionally equivalent to the service control point. Several service control points can also commonly access a service support system and commonly utilize its resources.

We claim:

1. Method for providing a subscriber (SUB1, SUB2) with information relating to charges for telecommunication services associated with a communication link, wherein with the method a call-charge device (CHARGE) receives one or more call-metering messages (MP) associated with the communication link and calculates from the received call-metering messages (MP) the charges (CH) accrued during operation of the communication link, characterized in that the call-charge device (CHARGE) associates with the calculated charges (CH) an acoustic signal which causes an electric signal (ES) corresponding to the associated acoustic signal to be generated at a selected point in time during said operation of the communication link, and that the acoustic signal is conveyed to the subscriber (SUB1, SUB2) by an electro-acoustic transducer (LS) controlled by the electric signal (ES).

2. Method according to claim 1, characterized in that with the respective calculated charges (CH) there is periodically associated an acoustic signal which is transmitted to the subscriber (SUB1, SUB2).

3. Method according to claim 1, characterized in that the calculated charges (CH) are compared to a threshold value and that, when the calculated charges (CH) reach said threshold value, the acoustic signal is associated with the calculated charges (CH) and transmitted to the subscriber (SUB1, SUB2).

4. Method according to claim 1, characterized in that a respective voice signal constitutes the acoustic signal and is associated with the calculated charges (CH).

5. Call-charge device (CHARGE) for informing a subscriber (SUB1, SUB2) about charges for telecommunication services associated with a communication link, comprising a calculating unit (CALC) for receiving call-metering messages (MP) and for calculating charges (CH) accumulated during operation of the communication link from one or more received call-metering messages (MP), characterized in that the call-charge device (CHARGE) is provided with a signal generator (GEN) for associating an acoustic signal with calculated charges (CH) and for generating an electric signal (ES) corresponding to the acoustic signal at a selected point in time during said operation of the communication link.

6. Subscriber terminal (TE4) for connection to a communication network (KN) comprising a call-charge device (CHARGE) according to claim 5 and an electro-acoustic transducer (LS) adapted to be controlled by the electric signal (ES) and capable of transmitting the acoustic signal to the subscriber (SUB1).

7. Subscriber terminal (TE4) according to claim 6, characterized in that the electro-acoustic transducer (LS) is the same electro-acoustic transducer used for the communication via the communication link.

8. Service unit (SU) of a communication network (KN) comprising a call-charge device (CHARGE) according to claim 5 and a coupler (COUP) adapted to couple the electric signal (ES) during the operation of the communication link into a voice channel associated with the communication link.

* * * * *

UNITED STATES PATENT AND TRADEMARK OFFICE
CERTIFICATE OF CORRECTION

PATENT NO. : 6,002,755
DATED : December 14, 1999
INVENTOR(S) : L. Krank et al

It is certified that error appears in the above-identified patent and that said Letters Patent is hereby corrected as shown below:

On the title page: Item [56]

after line 5, please insert the following:

--5,148,472    9/1992    Freese et al    379/59

FOREIGN PATENT DOCUMENTS

| | | |
|---|---|---|
| 3221695 | 12/1983 | Germany |
| 3512788 | 8/1986  | Germany |
| 4219416 | 12/1993 | Germany |

OTHER PUBLICATIONS

"Münztelefon 23", W. Braun, *Unterrichtsblätter*, Jg. 47, 1/1994, pp. 4-21.

G. Siegmund, *Fundamentals of Telephone Switching Engineering*, R. v.Decker Verlag, G. Schenk, 1991, Chapter 3.4.1, "Secondary Exchange", pp. 93-94.--.

Signed and Sealed this

Eighteenth Day of July, 2000

Attest:

Q. TODD DICKINSON

*Attesting Officer*    *Director of Patents and Trademarks*